UNITED STATES PATENT OFFICE.

JOSEPH BIERER, OF BASLE, SWITZERLAND, ASSIGNOR TO L. DURAND, HUGUENIN & CIE., OF SAME PLACE, ST. FONS, FRANCE, AND HÜNINGEN, GERMANY.

BLUE DYE AND PROCESS OF MAKING SAME.

SPECIFICATION forming part of Letters Patent No. 551,885, dated December 24, 1895.

Application filed March 27, 1895. Serial No. 543,375. (Specimens.) Patented in France November 17, 1894, No. 242,956.

*To all whom it may concern:*

Be it known that I, JOSEPH BIERER, chemist, a citizen of the French Republic, and a resident of Basle, Switzerland, have invented new and useful Improvements in the Manufacture of Blue Gallocyanine Dyes, (which have been patented in France by Patent No. 242,956, dated November 17, 1894,) of which the following is a clear and complete specification.

By the action of an aromatic amine—such, for instance, as anilin, toluidin, or the like—upon the gallocyanin coloring-matter produced by the reaction of hydrochlorid of diethylamidoazobenzene or of hydrochlorid of nitrosodiethylanilin upon gallamic acid there are obtained new coloring-matters which can be readily converted into sulfo-acids, and the soda salts of which are readily soluble in water, and produce blue shades of color upon non-mordanted wool or silk, and also upon chrome mordants.

By the action of the hydrochlorid of nitrosodiethylanilin on gallamic acid one obtains exactly the same coloring-matter that is obtained by the action of diethylamidoazobenzene on gallamic acid, and hence these hydrochlorids are equivalents so far as my invention is concerned.

Example: Ten kilos of the coloring-matter obtained by the action of hydrochlorid of diethylamidoazobenzene or of hydrochlorid of nitrosodiethylanilin upon gallamic acid are heated together with twenty kilos of anilin for about three hours to a temperature of 50° centigrade with constant agitation. After the mixture has stood for a day and has become cool it is filtered off. The coloring-matter thus produced is only slightly soluble in alcohol. It is washed in alcohol to remove the last traces of anilin, then pressed and dried; or after the reaction is completed the mixture is poured into water acidulated with hydrochloric acid, in order to neutralize the anilin with hydrochloric acid. It is then filtered, pressed, and dried.

The following tabular statement sets forth some of the main characteristics which serve to distinguish the product of condensation thus produced from the original coloring-matter:

|   | Coloring-matter from gallamic acid and hydrochlorid of diethylamidoazobenzene, or hydrochlorid of nitrosodiethylanilin. | Coloring-matter from gallamic acid and hydrochlorid of diethylamidoazobenzene, or hydrochlorid of nitrosodiethylanilin, condensed with anilin. |
|---|---|---|
| Solubility in concentrated sulfuric acid. | Blue solution which changes to red on addition of water. | Red solution, wh'ch changes to yellow on addition of water. |
| Solubility in hydrochloric acid. | Red solution | Yellowish solution. |
| Solubility in water... | Reddish-violet solution. | Insoluble. |
| Addition of acetic acid to aqueous solution. | The color of the solution changes to red. | Remains insoluble. |
| Addition of acet'c acid to an alcoholic solution. | The color of the solution changes to red. | The color of the solution changes from blue to yellowish. |

Instead of employing the coloring-matter to be condensed with anilin in the form of a hydrochlorid, as in the preceding example, it may be employed in the form of a base; but in this case hydrochlorid of anilin and anilin are employed, instead of anilin alone. Furthermore, if the temperature at which the reaction takes place in the preceding example be varied, (without, however, exceeding the temperature that can be obtained with a water-bath,) then products of condensation are produced which vary in color from reddish-blue to greenish-blue. The higher the temperature employed at which the condensation takes place the greener is the product of condensation obtained. Finally, if in the preceding example the coloring-matter produced by condensation of gallamic acid with diethylamidoazobenzene or nitrosodiethylanilin is employed in the form of a base or of an acetate instead of a hydrochlorid salt, products of condensation are obtained the blue color of which has a redder tinge.

For use for industrial purposes the new coloring-matters are usually converted into sulfo-acids.

Example: Twenty-five kilos of the new product of condensation (produced, as stated in the preceding example, by condensation of anilin with the coloring-matter from gallamic acid and hydrochlorid of diethylamidoazobenzene or hydrochlorid of nitrosodiethylanilin) are heated together with seventy-five kilos of sulfuric acid containing ninety-six per cent. of $SO_4H_2$ to a temperature of 90°, until a sample of the mixture completely dissolves in alkaline water. The product of the reaction is then poured into water or brine, the acid in excess is neutralized with soda, and the precipitated sulfo-acid of the new coloring-matter is obtained by filtering, pressing, and, if necessary, by drying. It is insoluble in water and is converted in the well-known manner into a salt of soda, which is readily soluble in water. The soda salt of this sulfo-acid dyes non-mordanted wool or silk in an acid-bath blue. On mordants, and in particular on chrome mordants, it produces greenish-blue tints.

When fuming, sulfuric acid is employed for sulfonating the new coloring-matter, polysulfo-acids are produced which are directly soluble in water, and the soda salts of which can be readily precipitated from their aqueous solutions by the addition of common salt.

The solutions of the soda salts of the sulfoacids of the new coloring-matter in concentrated sulfuric acid, and also in hydrochloric acid, are red, and by the addition of a little water become yellow, and by the addition of much water become blue.

According as the one or the other of the hereinbefore-mentioned products of condensation is sulfonated, there are produced sulfoacids the alkaline salts of which give different blue tints in dyeing.

What I claim is—

1. The herein described process for the manufacture of new blue coloring matters by condensation of an aromatic monoamin such for instance as anilin, with the gallocyanin coloring matter obtained by the action of hydrochlorid of nitrosodiethylanilin upon gallamic acid as described.

2. The herein described process for the manufacture of new blue coloring matters by condensation of an aromatic monoamin, such for instance as anilin, with the gallocyanin dye resulting from the action of hydrochlorid of nitrosodiethylanilin upon gallamic acid, and by subsequent conversion of the product of condensation thus obtained into a sulfoacid by heating this product with sulfuric acid.

3. The herein described process for the manufacture of new blue coloring matters by condensation of an aromatic monoamin, such for instance as anilin, with the gallocyanin dye resulting from the action of hydrochlorate of nitrosodiethylanilin upon gallamic acid, conversion of the product of condensation thus obtained into a sulfoacid by heating this product with sulfuric acid and finally conversion of this sulfonic acid into an alkaline salt.

4. As a new article of manufacture the herein described sulfonated coloring matter in the form of an alkaline salt, which dyes non-mordanted wool and silk in an acid bath blue, produces on chrome mordants greenish blue tints and constitutes in dry state a blackish powder easily soluble in water and dissolving in concentrated sulfuric acid and also in hydrochloric acid with a red coloration, which by the addition of a little water, turns to yellow and by the addition of much water, becomes blue, as described.

In witness whereof I have hereunto signed my name in the presence of two subscribing witnesses.

JOSEPH BIERER.

Witnesses:
 JOHAN JAKOB BRAEK,
 AMAND RITTER.